(12) United States Patent
 Winterstein (10) Patent No.: US 8,761,349 B2
(45) Date of Patent: Jun. 24, 2014

(54) SYSTEMS AND METHODS OF MONITORING PERFORMANCE OF ACOUSTIC ECHO CANCELLATION

(71) Applicant: Citrix Systems, Inc., Fort Lauderdale, FL (US)

(72) Inventor: Florian Winterstein, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/665,239

(22) Filed: Oct. 31, 2012

(65) Prior Publication Data

US 2014/0119518 A1    May 1, 2014

(51) Int. Cl.
*H04M 1/24* (2006.01)
*H04M 3/08* (2006.01)
*H04M 3/22* (2006.01)
*H04M 9/08* (2006.01)

(52) U.S. Cl.
USPC .......................................... 379/3; 379/406.01

(58) Field of Classification Search
USPC ................... 379/3, 22.01–24, 27.02, 406.01, 379/406.05, 406.1
See application file for complete search history.

(56) References Cited

U.S. PATENT DOCUMENTS

| | | | | |
|---|---|---|---|---|
| 7,787,597 B1* | 8/2010 | Shlomot et al. | ..................... | 379/3 |
| 2006/0221876 A1* | 10/2006 | Kosanovic et al. | ............ | 370/286 |
| 2008/0232577 A1* | 9/2008 | Raifel et al. | ............. | 379/406.01 |
| 2010/0040204 A1* | 2/2010 | Chen et al. | ......................... | 379/3 |
| 2011/0311064 A1* | 12/2011 | Teutsch | ............................. | 381/26 |

OTHER PUBLICATIONS

Friedman, et al., "RTP Control Protocol Extended Reports (RTCP XR)," Nov. 2003, retrieved from <http://tools.ietf.org/html/rfc3611>.

* cited by examiner

*Primary Examiner* — Quoc D Tran
(74) *Attorney, Agent, or Firm* — McDermott Will & Emery LLP (57) ABSTRACT

Methods and systems monitoring performance of acoustic echo cancellation are described. An audio output is generated by applying a first acoustic echo cancellation algorithm to an audio input. One or more performance metrics for the first acoustic echo cancellation algorithm based on the audio output are determined via a second acoustic echo cancellation algorithm. The first acoustic echo cancellation algorithm is different from the second acoustic echo cancellation algorithm. The one or more performance metrics are provided for storage in a memory.

20 Claims, 4 Drawing Sheets

SYSTEMS AND METHODS OF MONITORING PERFORMANCE OF ACOUSTIC ECHO CANCELLATION

FIELD OF THE INVENTION

The subject technology relates generally to a communication technology. More specifically, the subject technology relates to monitoring performance of acoustic echo cancellation.

BACKGROUND OF THE INVENTION

Some communication devices, for example telephones or computers implementing Voice over Internet Protocol (VoIP) include an acoustic echo canceller, which functions to remove echo of remotely sourced audio that is played by the local speaker(s) of the communication device, for example, to prevent a remote caller from hearing his/her own voice. In some cases, the acoustic echo canceller operates poorly or fails to remove the echo.

SUMMARY OF THE INVENTION

In some aspects, a computer-implemented method for monitoring performance of acoustic echo cancellation is provided. The method includes facilitating generation of an audio output by applying a first acoustic echo cancellation algorithm to an audio input. The method includes determining, via a second acoustic echo cancellation algorithm, one or more performance metrics for the first acoustic echo cancellation algorithm based on the audio output. The first acoustic echo cancellation algorithm is different from the second acoustic echo cancellation algorithm. The method includes providing the one or more performance metrics for storage in a memory.

In some aspects, a non-transitory computer-readable medium for monitoring performance of acoustic echo cancellation is provided. The computer-readable medium includes instructions. The instructions include code for facilitating generation of an audio output by applying a first acoustic echo cancellation algorithm to an audio input. The instructions include code for determining, via a second acoustic echo cancellation algorithm, one or more performance metrics for the first acoustic echo cancellation algorithm based on the audio output. The first acoustic echo cancellation algorithm is different from the second acoustic echo cancellation algorithm. The instructions include code for providing the one or more performance metrics for storage in a memory.

In some aspects, a system for monitoring performance of acoustic echo cancellation is provided. The system includes processing hardware and a memory. The memory includes instructions. The instructions include code for facilitating generation of an audio output by applying a first acoustic echo cancellation algorithm to an audio input. The instructions include code for determining, via a second acoustic echo cancellation algorithm, one or more performance metrics for the first acoustic echo cancellation algorithm based on the audio output. The first acoustic echo cancellation algorithm is different from the second acoustic echo cancellation algorithm. The instructions include code for providing the one or more performance metrics for storage.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

As set forth above, some communication devices, for example telephones or computers implementing Voice over Internet Protocol (VoIP) include an acoustic echo canceller, which functions to remove echo of remotely sourced audio that is played by the local speaker(s) of the communication device, for example, to prevent a remote caller from hearing his/her own voice. In some cases, the acoustic echo canceller operates poorly or fails to remove the echo. In such cases, techniques monitoring performance of the acoustic echo canceller may be desirable, for example, to determine the quality of the operation of the acoustic echo canceller and, if possible and necessary, to update the software of the acoustic echo canceller.

According to some aspects of the subject technology, an audio output is generated by applying a first acoustic echo cancellation algorithm to an audio input. One or more performance metrics for the first acoustic echo cancellation algorithm based on the audio output are determined via a second acoustic echo cancellation algorithm. The one or more performance metrics are provided for storage in a memory.

The first acoustic echo cancellation algorithm is different from the second acoustic echo cancellation algorithm as, if the first acoustic echo cancellation algorithm fails to remove echo or noise, the first acoustic echo cancellation algorithm is not aware of the echo or the noise that was not removed. Therefore, the first acoustic echo cancellation algorithm cannot monitor its own performance. However, the second acoustic echo cancellation algorithm may notice the echo or the noise that the first acoustic echo cancellation algorithm failed to remove by virtue of the second acoustic echo cancellation algorithm being different from the first acoustic echo cancellation algorithm.

Figure 1:
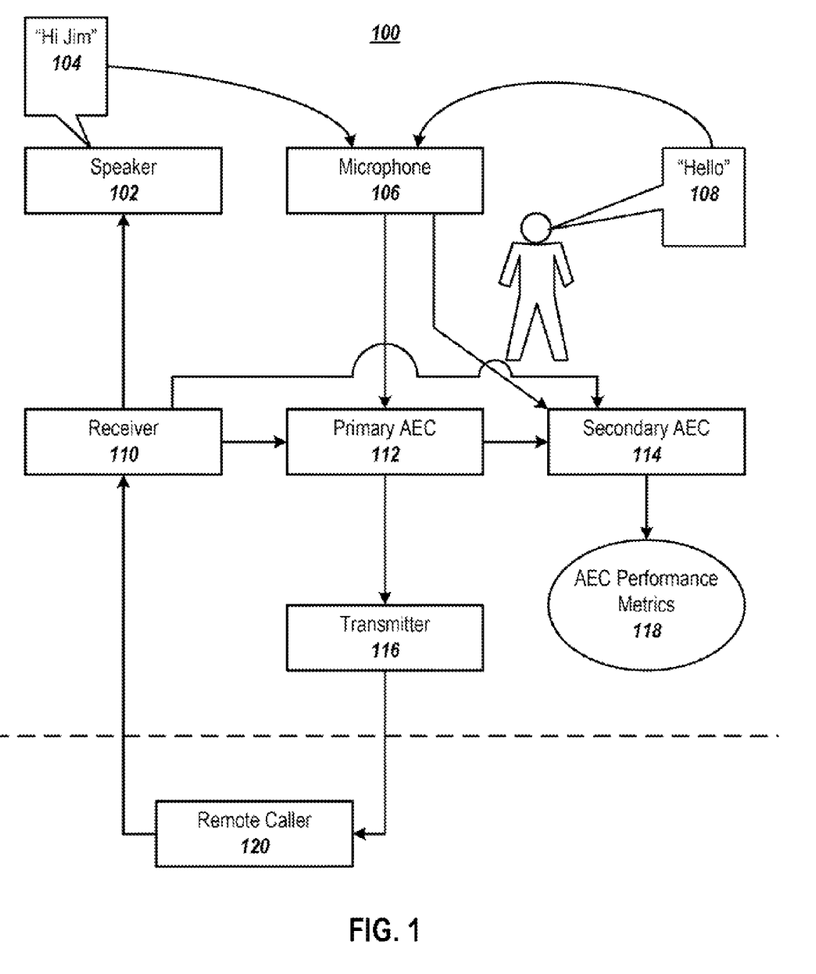
FIG. 1 illustrates an example data flow diagram of a system for monitoring performance of acoustic echo cancellation.

FIG. 1 illustrates an example data flow diagram of a system 100 for monitoring performance of acoustic echo cancellation.

The system 100 can be implemented with a telephone (e.g., a mobile phone or a fixed land-line telephone) or any computing device implementing a telephony program (e.g., a cellular calling program, a Voice over Internet Protocol (VoIP) program, an online meeting program including, for example, voice or video chat capabilities, or a voice or video chat program). In some examples, the telephone or the computing device operates in a speakerphone mode. As shown, the system 100 includes a speaker 102, a microphone 106, a receiver 110, a primary acoustic echo canceller (AEC) 112, a secondary AEC 114, and a transmitter 116.

As illustrated in FIG. 1, a remote caller 120 provides a far end audio signal to the receiver 110, and the receiver provides the far end audio signal to the speaker 102. The speaker 102 then plays the far end audio signal (e.g., "Hi Jim") 104. The remote caller could correspond to a remote user calling a local user via a telephone or a telephony program. The local user can accept or answer the call and provide an audio response (e.g., "Hello") 108 to the microphone 106. The audio input to the microphone, the near end audio signal, includes both the far end audio signal played from the speaker 104 and the locally-sourced audio response 108 from the local user.

The primary AEC 112 receives as input the far end audio signal from the receiver 110 and the near end audio signal input to the microphone 106. The primary AEC 112 operates generate an audio output by fully or partially filtering out the far end audio signal from the near end audio signal input to the microphone so that only the locally-sourced audio response 108 can be transmitted to the remote caller. (E.g., The primary AEC 112 attempts to ensure that the remote caller hears "Hello" 108, as spoken by the local caller, but not "Hi Jim" 112, as spoken by the remote caller.) In some cases, the primary AEC 112 may be unsuccessful in filtering out the far end audio signal from the audio input. The primary AEC 112 may also filter out noise (e.g., white noise, background noise, air or vehicle noise, etc.) from the near end audio signal. To filter out the far end audio signal from the near end audio signal, the primary AEC 112 uses an acoustic echo cancellation algorithm, for example, AEC or AECM (AEC Mobile) from the open source library WebRTC. The primary AEC 112 provides the audio output to the transmitter 116 and to the secondary AEC 114.

The primary AEC 112 can be implemented in software or in hardware. The primary AEC 112 can reside on the same computing device as the speaker 102 and the microphone 106. Alternatively, the primary AEC 112 may reside on the network (e.g., via cloud computing) or on a server different from the computing device of the speaker 102 and the microphone 106.

The transmitter 116 transmits the audio output (from the primary AEC 112) to the remote caller 120, so that the remote caller 120 can hear the audio response 108. The remote caller 120 may transmit additional audio data (e.g., an additional far end audio signal) to the receiver 110. As illustrated, the transmitter 116 and the receiver 110 are different devices. However, in some aspects, the transmitter 116 and the receiver 110 may be implemented in the same device. For example, the transmitter 116 and the receiver 110 can both be included in a network interface that includes one or more network interface cards (NICs).

The secondary AEC 114 receives one or more of the near end audio signal input to the primary AEC, the audio output from the primary AEC 112, or the far end audio signal from the receiver 110. In some aspects, the secondary AEC 114 independently fully or partially filters out the far end audio signal or noise from the audio input. The secondary AEC 114 determines, for example, by comparing the result of the filtering by the primary AEC 112 with the result of the filtering by the secondary AEC 114, one or more AEC performance metrics 118 for the primary AEC 112. The AEC performance metrics 118 can include a signal (audio response 108) level of the audio output or a noise (far end audio signal 104 or other noise) level of the audio output. The AEC performance metrics 118 can include echo return loss (ERL), echo return loss enhancement (ERLE), or residual echo return loss (RERL).

The secondary AEC 114 implements a different acoustic echo cancellation algorithm than the primary AEC 112. As a result, the secondary AEC 114 is able to detect failure(s) of the primary AEC in detection of echo (e.g., of the far end audio signal) or noise (e.g., background noise). The secondary AEC 114 can be implemented in software or in hardware. The secondary AEC 114 can reside on the same computing device as the speaker 102 and the microphone 106. Alternatively, the secondary AEC 114 may reside on the network (e.g., via cloud computing) or on a server different from the computing device of the speaker 102 and the microphone 106.

As used herein, the phrase "signal level," encompasses its plain and ordinary meaning including but not limited to a ratio of a signal level to a 0 dBm0 reference, expressed in decibels. The signal level may be measured only for packets containing speech energy. The intent of this metric may be, in some cases, not to provide a precise measurement of the signal level but to provide a real time indication that the signal level may be excessively high or low. One approach for calculating the signal level is set forth in equation (1) below.

$$\text{signal level} = 10 \text{ Log } 10(\text{rms talkspurt power (mW)}) \quad (1)$$

Typical values may generally be in the −15 to −20 dBm range.

As used herein, the term "dBm0," encompasses its plain and ordinary meaning including but not limited to the power in dBm (the power ratio in decibels (dB) of the measured power referenced to one milliwatt (mW)) measured at a zero transmission level point (e.g., a physical point in an electronic circuit where a test signal may be inserted or measured, and for which the nominal power of the test signal is specified).

As used herein, the phrase "noise level," encompasses its plain and ordinary meaning including but not limited to a ratio of a silent period background noise level to a 0 dBm0 reference, expressed in decibels. One approach for calculating the noise level is set forth in equation (2) below.

$$\text{noise level} = 10 \text{ Log } 10(\text{rms silence power (mW)}) \quad (2)$$

As used herein, the phrase "echo return loss," encompasses its plain and ordinary meaning including but not limited to a ratio between an original signal and an echo level, which may be expressed in decibels (dB).

As used herein, the phrase "echo return loss enhancement," encompasses its plain and ordinary meaning including but not limited to an improvement in echo level introduced by the echo canceller, which may be expressed in decibels (dB).

As used herein, the phrase "residual echo return loss," encompasses its plain and ordinary meaning including but not limited to a sum (as expressed in decibels) of the echo return loss and the echo return loss enhancement. One approach for calculating the residual echo return loss is set forth in equation (3) below.

$$\text{RERL(dB)} = \text{ERL (dB)} + \text{ERLE (dB)} \quad (3)$$

Figure 2:
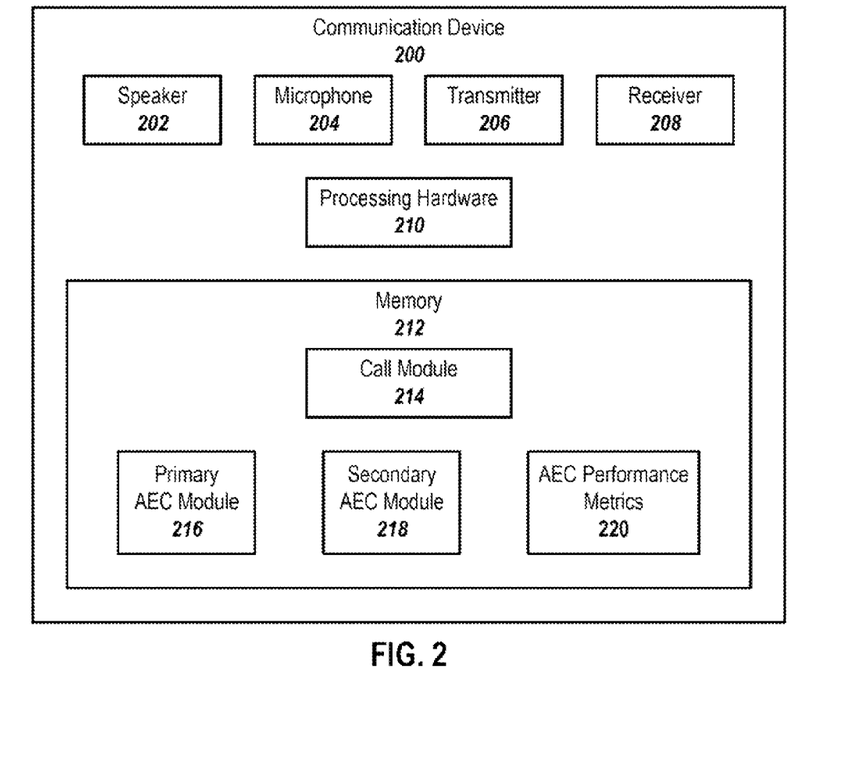
FIG. 2 illustrates an example communication device for monitoring performance of acoustic echo cancellation.

FIG. 2 illustrates an example communication device 200 for monitoring performance of acoustic echo cancellation.

The communication device 200 can be one or more of a computing device (e.g., client computing device, end-user communication device, mobile device, tablet computer, laptop, or desktop computer) running communication software (e.g., VoIP software or telephony software), a VoIP, landline, or mobile telephone, a radio communication device, etc. As shown, the communication device 200 includes a speaker 202, a microphone 204, a transmitter 206, a receiver 208, processing hardware 210, and a memory 212.

The speaker 202 is configured to provide an audio output that is received from a remote caller, for example, via operation of the receiver 208. The speaker 202 could be a component of the communication device 200 or connected to the communication device 200 via an audio output port, a universal serial bus (USB) port, or any other wired or wireless connection. In some aspects, the speaker 202 corresponds to the speaker 102 of FIG. 1. While only a single speaker 202 is illustrated, the subject technology can be implemented with multiple speakers.

The microphone 204 is configured to receive an audio input. The audio input can include one or more of audio coming from the speaker 202, audio spoken by a user proximate to the communication device 200, or background noise. The microphone 204 could be a component of the communication device 200 or connected to the communication device 200 via an audio input port, a USB port, or any other wired or wireless connection. In some aspects, the microphone 204 corresponds to the microphone 106 of FIG. 1. While only a single microphone 204 is illustrated, the subject technology can be implemented with multiple microphones.

The transmitter 206 is configured to transmit audio information (e.g., audio input received via the microphone 204 or a modified form of the audio input received via the microphone 204) to a remote caller, for example, via a network or other connection. The network can correspond to the Internet, an intranet, a local area network, a wide area network, a cellular network, or a public switched telephone network (PSTN). In some aspects, the transmitter 206 corresponds to the transmitter 116 of FIG. 1.

The receiver 208 is configured to receive a far end audio signal (e.g., audio coming from a remote caller), for example, via the network or the other connection. The receiver 208 is configured to transmit the received far end audio signal to the speaker 202 for providing the received far end audio signal to the user of the communication device 200. In some aspects, the receiver 208 corresponds to the receiver 110 of FIG. 1.

The processing hardware 210 includes one or more processors that are configured to carry out instructions stored in the memory 212. The processing hardware 210 can correspond to a central processing unit (CPU) or any other processing unit.

The memory 212 can correspond to a cache unit, a storage unit, an internal memory unit, or an external memory unit. The memory 212 is configured to store data or instructions. As shown, the memory 212 includes a call module 214, a primary AEC module 216, a secondary AEC module 218, and AEC performance metrics 220.

The call module 214 is configured to facilitate placing a call between a user of the communication device 200 and a remote caller. Audio spoken by the user is received via the microphone 204, and audio spoken by the remote caller (e.g., the far end audio signal) is played via the speaker 202. According to some aspects, the call module 214 is configured to receive an audio input (e.g., the near end audio signal) from the microphone 204. The call module 214 is configured to invoke the primary AEC module 216 to generate an audio output based on the audio input. The primary AEC module 216 generates the audio output by applying a primary acoustic echo cancellation algorithm to the audio input to remove audio from the remote caller coming from the speaker 202 or white noise from the audio input. The call module 214 determines, via the secondary AEC module 218, one or more AEC performance metrics 220 for the primary AEC module 216 based on the audio output. For example, the secondary AEC module 218 could apply a secondary acoustic echo cancellation algorithm, different from the primary acoustic echo cancellation algorithm of the primary AEC module 216, to the audio input (e.g., the near end audio signal) and compare the output of the secondary acoustic echo cancellation algorithm to the audio output of the primary acoustic echo cancellation algorithm. The AEC performance metrics 220 can be determined using the comparison of the output of the secondary acoustic echo cancellation algorithm to the audio output. The call module 214 stores the AEC performance metrics 220 in a memory (e.g., memory 212 or a remote memory accessible via a network). The AEC performance metrics 220 can then be reviewed by a human operator and used to determine the quality of the primary AEC module 216 or to improve the primary AEC module (e.g., by manually reprogramming or redesigning the primary AEC module).

In some aspects, the primary AEC module 216 corresponds to the primary AEC 112 of FIG. 1. The secondary AEC module 218 corresponds to the secondary AEC 114 of FIG. 1. The AEC performance metrics 220 correspond to the AEC performance metrics 118 of FIG. 1.

As illustrated in FIG. 2, the communication device 200 is a single device. However, the communication device 200 could be implemented as multiple devices. For example, the speaker 202, microphone 204, transmitter 206, and receiver 208 could reside on an end-user communication device (e.g., a thin phone or "dumb" phone connected to a network), while the memory 212 and the components 214, 216, 218, and 220 of the memory 212 can reside on a network device (e.g., in the cloud, in one or more servers, or in one or more data repositories). Furthermore, the call module 214, the primary AEC module 216, and the secondary AEC module 218 are illustrated as being implemented in software. However, one or more of the modules 214, 216, or 218 can be implemented in hardware or in a combination of software and hardware.

Figure 3:
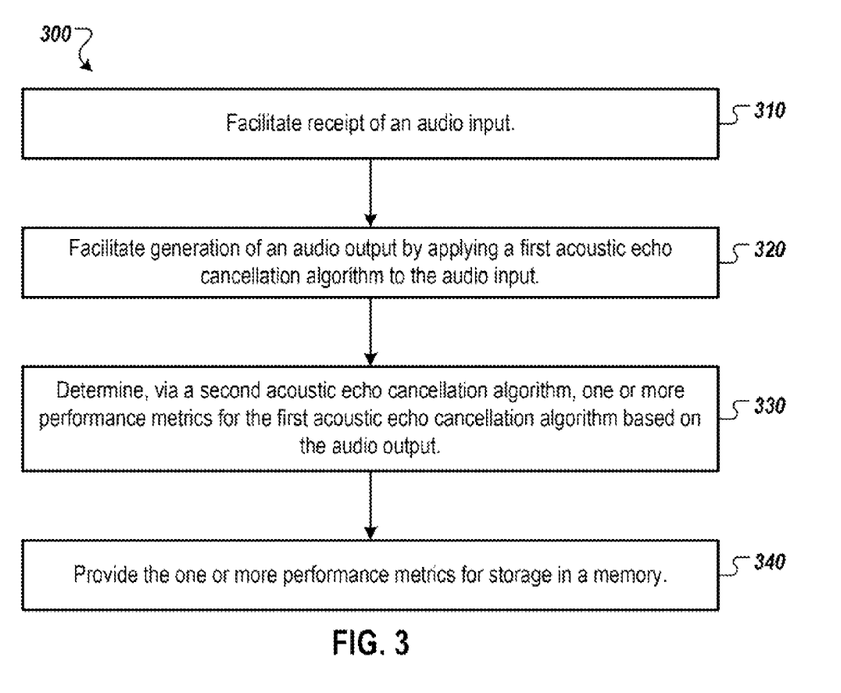
FIG. 3 illustrates an example process for monitoring performance of acoustic echo cancellation.

FIG. 3 illustrates an example process 300 for monitoring performance of acoustic echo cancellation.

The process 300 begins at step 310, where one or more computers (e.g., communication device 200, a telephony client device, a telephony server, etc.) facilitate receipt of an audio input. For example, the audio input could be received via a microphone. The audio input can include audio spoken by a local caller using a communication device, audio from a remote caller playing via a speaker of the communication device, or background noise (e.g., from a vehicle, an air conditioner, a dishwasher, a laundry machine, etc.).

In step 320, the one or more computers facilitate generation of an audio output by applying a first acoustic echo cancellation algorithm (e.g., primary AEC 112 or primary AEC module 216) to the audio input. The audio output is provided to a remote communication device (e.g., a communication device of the remote caller). The audio output is also provided to the one or more computer for further processing as set forth below. The audio input can include a signal (e.g., audio spoken by the local caller) and a noise (e.g., background noise or audio from the remote caller playing via the speaker). The first acoustic echo cancellation algorithm is for cancelling at least a portion of the noise.

In step 330, the one or more computers determine, via a second acoustic echo cancellation algorithm (e.g., secondary AEC 114 or secondary AEC module 218) one or more performance metrics (e.g., AEC performance metrics 118 or AEC performance metrics 220) for the first acoustic echo cancellation algorithm based on the audio output. The second acoustic echo cancellation algorithm is different from the first acoustic echo cancellation algorithm. The one or more performance metrics can include a signal level of the audio output or a noise level of the audio output. The one or more performance metrics can include echo return loss (ERL), echo return loss enhancement (ERLE), or residual echo return loss (RERL) of the audio output.

In step 340, the one or more computer provide the one or more performance metrics for storage in a memory (e.g., in a data repository, in a storage unit of a server, or in a local cache or storage unit of the one or more computers). The one or more performance metrics can be accessed by a human operator for analyzing, improving, or monitoring performance of the first acoustic echo cancellation algorithm. In some examples, the human operator can determine that the first acoustic echo cancellation algorithm is failing or working poorly. In response, the human operator may reprogram or attempt to improve the first acoustic echo cancellation algorithm, for example, by sending a software update to one or more devices implementing the first acoustic echo cancellation algorithm. After step 340, the process 300 ends.

Figure 4:
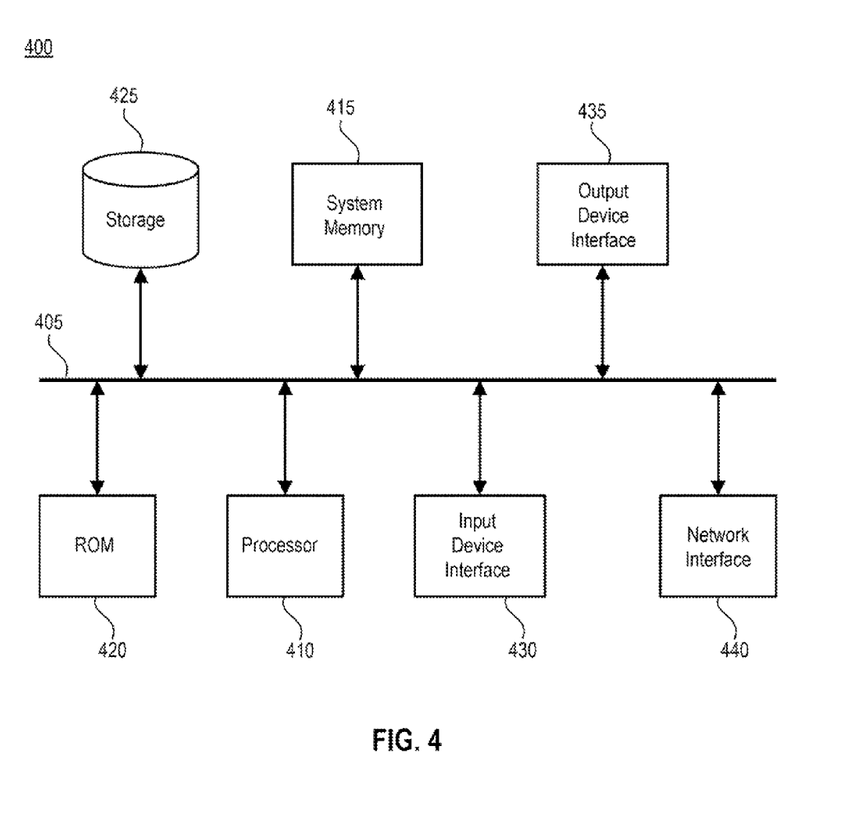
FIG. 4 conceptually illustrates an exemplary electronic system with which some implementations of the subject technology are implemented.

FIG. 4 conceptually illustrates an electronic system 400 with which some implementations of the subject technology are implemented. For example, the communication device 200 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for monitoring performance of acoustic echo cancellation in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touch screen that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for monitoring performance of acoustic echo cancellation, the method comprising:

facilitating generation of an audio output by applying a first acoustic echo cancellation algorithm to an audio input, wherein the first acoustic echo cancellation algorithm is programmed in software;

determining, by comparing the generated audio output with an output of a second acoustic echo cancellation algorithm, one or more performance metrics for the first acoustic echo cancellation algorithm based on the generated audio output, wherein the first acoustic echo cancellation algorithm is different from the second acoustic echo cancellation algorithm;

providing the one or more performance metrics for storage in a memory; and providing a software update to the first acoustic echo cancellation algorithm in response to a determination that the first acoustic echo cancellation algorithm is failing or working poorly, wherein the determination that the first acoustic echo cancellation algorithm is failing or working poorly is based on an analysis of the one or more performance metrics stored in the memory.

2. The method of claim 1, further comprising:
facilitating receipt of the audio input.

3. The method of claim 1, further comprising:
facilitating provision of the audio output to a remote communication device.

4. The method of claim 1, wherein the one or more performance metrics comprise a signal level of the audio output or a noise level of the audio output.

5. The method of claim 1, wherein the one or more performance metrics comprise echo return loss (ERL), echo return loss enhancement (ERLE), or residual echo return loss (RERL).

6. The method of claim 1, wherein the memory comprises a local cache or storage unit.

7. The method of claim 1, wherein the memory comprises a storage unit of a server or a data repository.

8. The method of claim 1, wherein the audio input comprises a signal and a noise, and wherein the first acoustic echo cancellation algorithm is for cancelling at least a portion of the noise.

9. The method of claim 8, wherein the noise comprises a remotely generated sound played by a local speaker, and wherein the signal comprises a locally generated sound.

10. A system for monitoring performance of acoustic echo cancellation, the system comprising:
processing hardware; and
a memory comprising instructions which, when executed by the processing hardware, cause the processing hardware to implement a method, the method comprising:
facilitating generation of an audio output by applying a first acoustic echo cancellation algorithm to an audio input, wherein the first acoustic echo cancellation algorithm is programmed in software;
determining, by comparing the generated audio output with an output of a second acoustic echo cancellation algorithm, one or more performance metrics for the first acoustic echo cancellation algorithm based on the generated audio output, wherein the first acoustic echo cancellation algorithm is different from the second acoustic echo cancellation algorithm;
providing the one or more performance metrics for storage; and
providing a software update to the first acoustic echo cancellation algorithm in response to a determination that the first acoustic echo cancellation algorithm is failing or working poorly, wherein the determination that the first acoustic echo cancellation algorithm is failing or working poorly is based on an analysis of the one or more performance metrics.

11. The system of claim 10, further comprising:
a microphone for receiving the audio input; and
a speaker.

12. The system of claim 10, wherein the system resides in a client computing device or in an end-user communication device.

13. The system of claim 10, wherein the system resides in one or more servers or in one or more data repositories.

14. A non-transitory computer-readable medium for monitoring performance of acoustic echo cancellation, the computer-readable medium comprising instructions which, when executed by one or more computers, cause the one or more computers to perform a method, the method comprising:
facilitating generation of an audio output by applying a first acoustic echo cancellation algorithm to an audio input, wherein the first acoustic echo cancellation algorithm is programmed in software;
determining, by comparing the generated audio output with an output of a second acoustic echo cancellation algorithm, one or more performance metrics for the first acoustic echo cancellation algorithm based on the generated audio output, wherein the first acoustic echo cancellation algorithm is different from the second acoustic echo cancellation algorithm;
providing the one or more performance metrics for storage in a memory; and
providing a software update to the first acoustic echo cancellation algorithm in response to a determination that the first acoustic echo cancellation algorithm is failing or working poorly, wherein the determination that the first acoustic echo cancellation algorithm is failing or working poorly is based on an analysis of the one or more performance metrics stored in the memory.

15. The computer-readable medium of claim 14, the method further comprising:
facilitating receipt of the audio input.

16. The computer-readable medium of claim 14, the method further comprising:
facilitating provision of the audio output to a remote communication device.

17. The computer-readable medium of claim 14, wherein the one or more performance metrics comprise a signal level of the audio output or a noise level of the audio output.

18. The computer-readable medium of claim 14, wherein the one or more performance metrics comprise echo return loss (ERL), echo return loss enhancement (ERLE), or residual echo return loss (RERL).

19. The computer-readable medium of claim 14, wherein the memory comprises a local cache or storage unit.

20. The computer-readable medium of claim 14, wherein the memory comprises a storage unit of a server or a data repository.

* * * * *